US010607353B2

(12) United States Patent
Zhang et al.

(10) Patent No.: US 10,607,353 B2
(45) Date of Patent: Mar. 31, 2020

(54) STRUCTURED LIGHT DEPTH SENSING

(71) Applicant: Facebook Technologies, LLC, Menlo Park, CA (US)

(72) Inventors: Qi Zhang, Bellevue, WA (US); Qing Chao, Redmond, WA (US); Robin Sharma, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/118,346

(22) Filed: Aug. 30, 2018

(65) Prior Publication Data

US 2020/0074651 A1 Mar. 5, 2020

(51) Int. Cl.
*G06T 7/521* (2017.01)
*G02B 27/01* (2006.01)
*F21V 8/00* (2006.01)

(52) U.S. Cl.
CPC ............ *G06T 7/521* (2017.01); *G02B 6/0076* (2013.01); *G02B 27/0172* (2013.01); *G02B 27/0179* (2013.01); *G02B 2027/0138* (2013.01); *G02B 2027/0178* (2013.01); *G02B 2027/0187* (2013.01)

(58) Field of Classification Search
CPC .............. G02B 27/0093; G02B 27/017; G02B 2027/0178; G02B 27/0172; G02B 27/225; G02B 27/48; G02B 19/0057; G02B 27/01; G02B 27/0961; G06T 19/006; G06T 2207/10028; G06T 2207/10052; G06T 2207/10152; G06T 2207/30201; G06T 7/521; G01B 11/25; G01B 11/14; G01B 11/22; G01B 11/2545; G06F 3/013; G06F 1/163; G06F 2203/011; G06F 3/011; G06F 3/017; H04N 2013/0081; H04N 13/128; H04N 13/344; H04N 13/363; H04N 13/383; H04N 13/395; H04N 5/2256; A61B 2034/2065; A61B 2090/365; A61B 2090/502
USPC ............... 348/136; 353/28; 359/13; 382/154
See application file for complete search history.

(56) References Cited

U.S. PATENT DOCUMENTS

| | | | | |
|---|---|---|---|---|
| 8,570,372 B2 * | 10/2013 | Russell | .................. | G06F 3/013 348/136 |
| 9,291,828 B2 * | 3/2016 | Kroll | .................... | H04N 13/305 |
| 9,462,253 B2 * | 10/2016 | Hudman | ............ | G02B 19/0057 |
| 10,203,762 B2 * | 2/2019 | Bradski | ................ | G02B 27/225 |

(Continued)

OTHER PUBLICATIONS

"International Search Report and Written Opinion Issued in PCT Application No. PCT/US2018/049074", dated May 29, 2019, 14 Pages.

(Continued)

*Primary Examiner* — Nathnael Aynalem
(74) *Attorney, Agent, or Firm* — Freestone IP Law PLLC; Aaron J. Visbeek; Andrew J. Cameron (57) ABSTRACT

At least one waveguide is configured to receive coherent illumination light and direct the coherent illumination light to an object as a first light projection and second light projection. At least one interference pattern is generated by interference between the first light projection and the second light projection. A camera captures interference images of a plurality of phase-shifted interference images and a depth from an object may be determined from the phase-shifted interference images.

18 Claims, 9 Drawing Sheets

(56) References Cited

U.S. PATENT DOCUMENTS

| | | | | |
|---|---|---|---|---|
| 10,260,864 B2* | 4/2019 | Edwin | ................... | G02B 27/01 |
| 2006/0098166 A1* | 5/2006 | Scharenbroch | .... | G06K 9/00604 |
| | | | | 353/13 |
| 2010/0290060 A1* | 11/2010 | Mohazzab | ............ | G01B 11/25 |
| | | | | 356/492 |
| 2013/0050426 A1* | 2/2013 | Sarmast | .................. | G01S 17/89 |
| | | | | 348/46 |
| 2013/0215235 A1* | 8/2013 | Russell | .................. | G03B 35/00 |
| | | | | 348/47 |
| 2013/0322810 A1 | 12/2013 | Robbins | | |
| 2014/0168260 A1 | 6/2014 | O'Brien et al. | | |
| 2015/0178939 A1* | 6/2015 | Bradski | ................ | G02B 27/017 |
| | | | | 345/633 |
| 2015/0277125 A1 | 10/2015 | Hirano et al. | | |
| 2016/0109232 A1* | 4/2016 | Shin | .................... | H04N 5/2256 |
| | | | | 348/140 |
| 2017/0192499 A1 | 7/2017 | Trail | | |
| 2018/0053284 A1 | 2/2018 | Rodriguez et al. | | |
| 2018/0073864 A1* | 3/2018 | Watanabe | .......... | G01B 9/02001 |
| 2018/0275394 A1* | 9/2018 | Yeoh | ....................... | G02B 3/14 |

OTHER PUBLICATIONS

Chao, Qing, "Integrated Optical Chip for Generating Patterned Illumination," U.S. Appl. No. 16/028,197, filed Jul. 5, 2018, 59 pages.

Chao, Qing, "Structured Light Eye-Tracking," U.S. Appl. No. 16/025,837, filed Jul. 2, 2018, 72 pages.

\* cited by examiner

801 — $I_1(x,y) = I_{DC}(x,y) + I_m(x,y)\cos(\emptyset(x,y) - \Delta\emptyset)$

802 — $I_2(x,y) = I_{DC}(x,y) + I_m(x,y)\cos(\emptyset(x,y))$

803 — $I_3(x,y) = I_{DC}(x,y) + I_m(x,y)\cos(\emptyset(x,y) + \Delta\emptyset)$

804 — $\emptyset_{wrapped} = tan^{-1}\left(\dfrac{\sqrt{3}}{2}\dfrac{I_1(x,y) - I_3(x,y)}{2I_2(x,y) - I_1(x,y) - I_3(x,y)}\right)$ 805 — $\emptyset_{unwrapped} = \emptyset_{wrapped} + 2N\pi$ 806 — $I = I_0 \cos^2\left(\tan\theta\dfrac{a\pi}{\lambda}\right)$ 807 — $I = I_0 \cos^2\left(\tan\theta - \tan^{-1}\left(\dfrac{D}{z} - \dfrac{x_1}{f}\right)\right)\left(\dfrac{a\pi}{\lambda}\right)$ 808 — $\emptyset_{unwrapped}$

FIG. 8

STRUCTURED LIGHT DEPTH SENSING

TECHNICAL FIELD

This disclosure relates generally to optics, and in particular to depth sensing.

BACKGROUND INFORMATION

A variety of techniques for range and depth sensing have been developed. For example, a stereo triangulation technique includes imaging an object with two different cameras and determining a distance to the object using corresponding points in the images from the two cameras. Time of Flight (TOF) is another existing technique that may include transmitting laser pulses and measuring the time of flight between the transmitted and reflected laser pulse to calculate the depth of an object that reflected the laser pulse. However, these techniques are limited by the context they are deployed in. TOF techniques, for example, struggle in very near-range contexts because resolving the short time of flight of the pulses is difficult.

SUMMARY

Embodiments according to the invention are in particular disclosed in the attached claims directed to a head mounted display (HMD), an optical structure, and a method, wherein any feature mentioned in one claim category, e.g. HMD, can be claimed in another claim category, e.g. optical structure, method, system, storage medium, and computer program product, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

In an embodiment, a Head Mounted Display (HMD) may comprise:
at least one camera configured to image an eyebox area; and
an optical structure to be positioned in a view of a user of the HMD, wherein the optical structure includes a first, second, and third waveguide configured to receive coherent illumination light and direct the coherent illumination light to the eyebox area as a first light projection and a second light projection to generate a first, second, and third interference pattern corresponding to the first, second, and third waveguides, respectively, and wherein the camera is configured to capture the first, second, and third interference patterns.

The first, second, and third waveguide each may include a first extraction feature to direct the first light projection to a first area and a second extraction feature to direct the second light projection to an area different from the first area, and an overlap of the first light projection and the second light projection from each respective waveguide may generate the respective interference pattern on the eyebox area.

In an embodiment, a HMD may comprise:
a first coherent light source configured to emit first coherent illumination light, wherein the first waveguide is configured to receive the first coherent illumination light;
a second coherent light source configured to emit second coherent illumination light, wherein the second waveguide is configured to receive the second coherent illumination light; and
a third coherent light source configured to emit third coherent illumination light, wherein the third waveguide is configured to receive the third coherent illumination light, and wherein the first and second extraction feature of the first, second, and third waveguides are spaced differently to generate a first, second, and third interference pattern, respectively, that are phase-shifted from each other, and further wherein the first, second, and third coherent illumination light are the same wavelength.

The third interference pattern may be phase-shifted from the second interference pattern by 120 degrees, and the second interference pattern may be phase-shifted from the first interference pattern by 120 degrees.

In an embodiment, a HMD may comprise:
a fourth coherent light source, wherein the optical structure includes a fourth waveguide configured to generate a fourth interference pattern in the eyebox area, wherein the fourth interference patter is phase-shifted from the third interference pattern by 90 degrees, the third interference pattern is phase-shifted from the second interference pattern by 90 degrees, and the second interference pattern is phase-shifted from the first interference pattern by 90 degrees.

In an embodiment, a HMD may comprise:
a first coherent light source configured to emit first coherent illumination light, wherein the first waveguide is configured to receive the first coherent illumination light;
a second coherent light source configured to emit second coherent illumination light, wherein the second waveguide is configured to receive the second coherent illumination light; and
a third coherent light source configured to emit third coherent illumination light, wherein the third waveguide is configured to receive the third coherent illumination light, wherein the first, second, and third coherent illumination light are at different infrared wavelengths.

At least one of the first extraction feature or the second extraction feature may include a reflective coating configured to direct the first light projection or the second light projection.

The first, second, and third interference patterns may include sinusoidal fringe patterns.

The coherent illumination light may be coherent infrared light.

The camera may include a filter that passes an infrared wavelength range matched to the coherent illumination light and rejects other wavelength ranges.

A coherent light source providing the coherent illumination light may include at least one of an infrared vertical-cavity surface-emitting laser (VCSEL), laser diode, superluminescent light emitting diode (SLED) with high spatial coherency, or distributed feedback laser (DFB).

An imaging axis of the camera in relation to a projection axis between the first and second light projection may be greater than 30 degrees.

The first, second, and third waveguides may be configured as single-mode waveguides.

In an embodiment, an optical structure may comprise: a transparent layer; and
a first, second, and third waveguide configured to guide coherent illumination light, wherein the first, second, and third waveguides are coupled with the transparent layer, wherein each of the first, second, and third waveguide include:
a first extraction feature configured to direct the coherent illumination light as a first light projection in an eyebox area; and
a second extraction feature configured to direct the coherent illumination light as a second light projection in the eyebox area, wherein the first light projection and the second light projection interfere to generate an interference pattern.

The first and second extraction feature of the first, second, and third waveguides may be spaced differently to generate a first, second, and third interference pattern, respectively, that are phase-shifted from each other.

The coherent illumination light may be centered around a near-infrared wavelength.

At least one of the first extraction feature or the second extraction feature may include a reflective coating configured to direct the first light projection or the second light projection, the reflective coating may include a dielectric or metallic coating configured to reflect the first light projection or the second light projection and pass visible light.

In an embodiment, a method of near-eye depth sensing may comprise:
generating a first, second, and third interference pattern in an eyebox area;
capturing, with a camera, a first, second, and third interference image corresponding to the first, second, and third interference pattern, respectively; and
generating at least one eye-depth value based at least in part on the first, second, and third interference image.

Generating the first, second, and third interference patterns may include directing coherent illumination light into at least one waveguide, and the at least one waveguide may include a first extraction feature to direct a first light projection to a first area and a second extraction feature to direct a second light projection to second area different from the first area.

The first, second, and third interference patterns may be generated sequentially and captured sequentially by the camera as the first, second, and third interference images.

In an embodiment according to the invention, one or more computer-readable non-transitory storage media may embody software that is operable when executed to perform a method according to the invention or any of the above-mentioned embodiments.

In an embodiment according to the invention, a system may comprise: one or more processors; and at least one memory coupled to the processors and comprising instructions executable by the processors, the processors operable when executing the instructions to perform a method according to the invention or any of the above-mentioned embodiments.

In an embodiment according to the invention, a computer program product, preferably comprising a computer-readable non-transitory storage media, may be operable when executed on a data processing system to perform a method according to the invention or any of the above-mentioned embodiments.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of depth sensing systems, devices, and methods are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise.

Embodiments of depth sensing systems, devices, and methods described in the disclosure may facilitate high resolution near-range depth sensing. The near-range depth sensing embodiments may be specifically implemented in a head mounted display (HMD) for determining a three-dimensional depth mapping of an eye of a wearer of an HMD and the three-dimensional depth mapping may be used for eye-tracking or other purposes.

Prior depth sensing techniques include Time of Flight and patterned projections. Time of Flight (ToF) techniques include transmitting laser pulses and measuring the time of flight between the transmitted and reflected laser pulse to calculate the depth of an object that reflected the laser pulse. However, ToF systems struggle in very near-range contexts because resolving the short time of flight of the pulses (propagating at the speed of light) is difficult. An example patterned projection technique projects a pattern of dots onto an object and the position and/or the size of the projected dots on the object are used to determine a depth of the object. However, the resolution of pattern projection approaches is limited by the number of dots projected onto the surface of the object.

In embodiments of the disclosure, phase-shifted interference patterns are generated by waveguides having first and second extraction features. The waveguides may receive coherent illumination light and provide the coherent illumination light to the first and second extraction features that are spaced a distance apart. The coherent illumination light may be provided by an infrared laser light source, for example. The first and second extraction features direct the received coherent illumination light to an eyebox area as first and second light projections. An interference pattern is formed by the interference of the first and second light projections and captured by a camera. Additional waveguides may generate additional interference patterns that are phase-shifted from the first interference patterns. For example, a minimum of three waveguides with extraction features may generate three or more interference patterns on an eye (or other object) where the three interference patterns are phase-shifted by 120 degrees. Intensity values from the three phase-shifted interference patterns can then be utilized to determine a depth map of the object.

Embodiments of the disclosure may be particularly useful in near-range depth sensing context where ToF systems struggle to generate accurate mappings. Additionally, embodiments of the disclosure may offer higher resolution depth-mappings than pattern projection techniques because the embodiments of the disclosure are not limited by a number of projected dots. Furthermore, the disclosed waveguides and extraction features may be so small as to be unnoticeable even when placed in view of a wearer of an HMD. Therefore, the embodiments of the disclosure may have the added of advantage of being placed within a field of view of an eye of a wearer of an HMD such that the user still has a clear view of incoming scene light. Embodiments of the disclosure may also provide a very low power depth sensing system because the disclosed coherent illumination light sources may only be mW devices that are not required to be on continuously. These and other embodiments are described in detail with respect to FIGS. 1A-8 below.

Figure 1A:
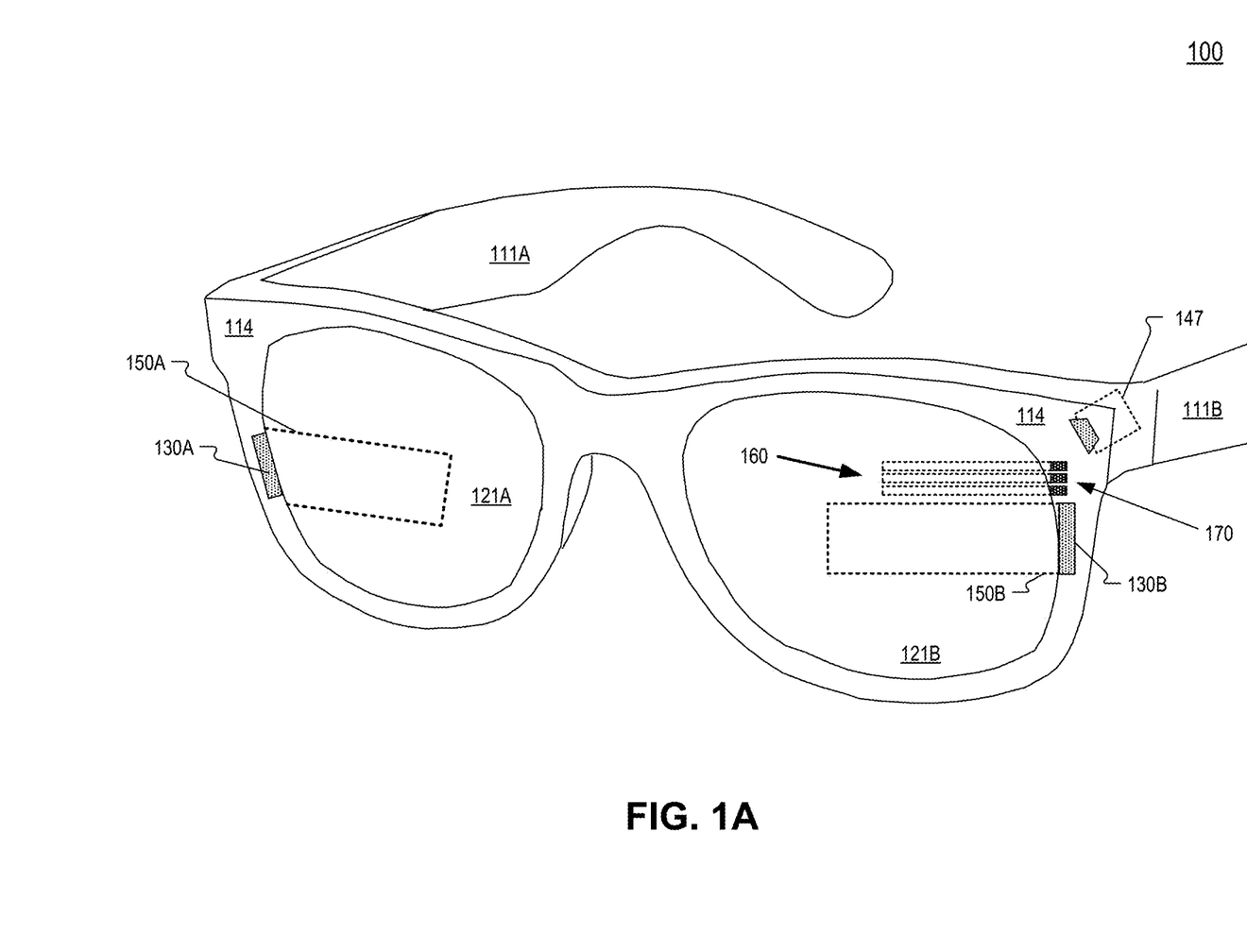
FIGS. 1A and 1B illustrate an example head mounted display that includes a camera and waveguides for generating phase-shifted interference patterns for near-eye depth sensing, in accordance with an embodiment of the disclosure.

FIG. 1A illustrates an example HMD 100 that includes a camera and waveguides that project light to generate phase differing interference patterns for near-eye depth sensing, in accordance with an embodiment of the disclosure. HMD 100 includes frame 114 coupled to arms 111A and 111B. Lenses 121A and 121B are mounted to frame 114. Lenses 121 may be prescription lenses matched to a particular wearer of HMD or non-prescription lenses. The illustrated HMD 100 is configured to be worn on or about a head of a user of the HMD.

In FIG. 1A, each lens 121 may include a waveguide 150 to direct image light generated by a display 130 to an eyebox area for viewing by a wearer of HMD 100. Display 130 may include an LCD, an organic light emitting diode (OLED) display, micro-LED display, quantum dot display, pico-projector, or liquid crystal on silicon (LCOS) display for directing image light to a wearer of HMD 100.

The frame 114 and arms 111 of the HMD 100 may include supporting hardware of HMD 100. HMD 100 may include any of processing logic, wired and/or wireless data interface for sending and receiving data, graphic processors, and one or more memories for storing data and computer-executable instructions. In one embodiment, HMD 100 may be configured to receive wired power. In one embodiment, HMD 100 is configured to be powered by one or more batteries. In one embodiment, HMD 100 may be configured to receive wired data including video data via a wired communication channel. In one embodiment, HMD 100 is configured to receive wireless data including video data via a wireless communication channel.

Lenses 121 may appear transparent to a user to facilitate augmented reality or mixed reality where a user can view scene light from the environment around her while also receiving image light directed to her eye(s) by waveguide(s) 150. Consequently, lenses 121 may be considered (or include) an optical combiner. In some embodiments, image light is only directed into one eye of the wearer of HMD 100. In an embodiment, both displays 130A and 130B are included to direct image light into waveguides 150A and 150B, respectively.

The example HMD 100 of FIG. 1A includes a plurality of waveguides 160 coupled to receive coherent illumination light from coherent illumination source(s) 170 and direct the coherent illumination light to an eyebox area as first and second light projections. The first and second light projection generate an interference pattern on the eye of a wearer of HMD 100. The coherent illumination light may be infrared light and light source(s) 170 may be any of an infrared vertical-cavity surface-emitting laser (VCSEL) laser diode, superluminescent light emitting diode (SLED) with high spatial coherency, or distributed feedback laser (DFB). In one embodiment, the infrared coherent illumination light is centered around 850 nm. Camera 147 is configured to image the eyebox area and the eye of a wearer of HMD 100. Camera 147 may be mounted on the inside of the temple of HMD 100 and image the eyebox area directly, as illustrated in FIG. 1A. Camera 147 may also be mounted elsewhere. In one embodiment, camera 147 is positioned to receive an infrared image from the eyebox area reflected from a "hot mirror" combiner include in lens 121B. The "hot mirror" combiner is configured to reflect infrared light while passing visible scene light to the eye of a wearer of HMD 100. Camera 147 may include a filter that passes an infrared wavelength range matched to the coherent illumination light of light source(s) 170 and rejects other wavelength ranges. Although camera 147, waveguides 160, and coherent illumination source(s) 170 are illustrated on only one side of HMD 100, they of course may be duplicated on the other side of HMD 100 to facilitate near-eye depth sensing for both eyes of a wearer of HMD 100.

Figure 1B:
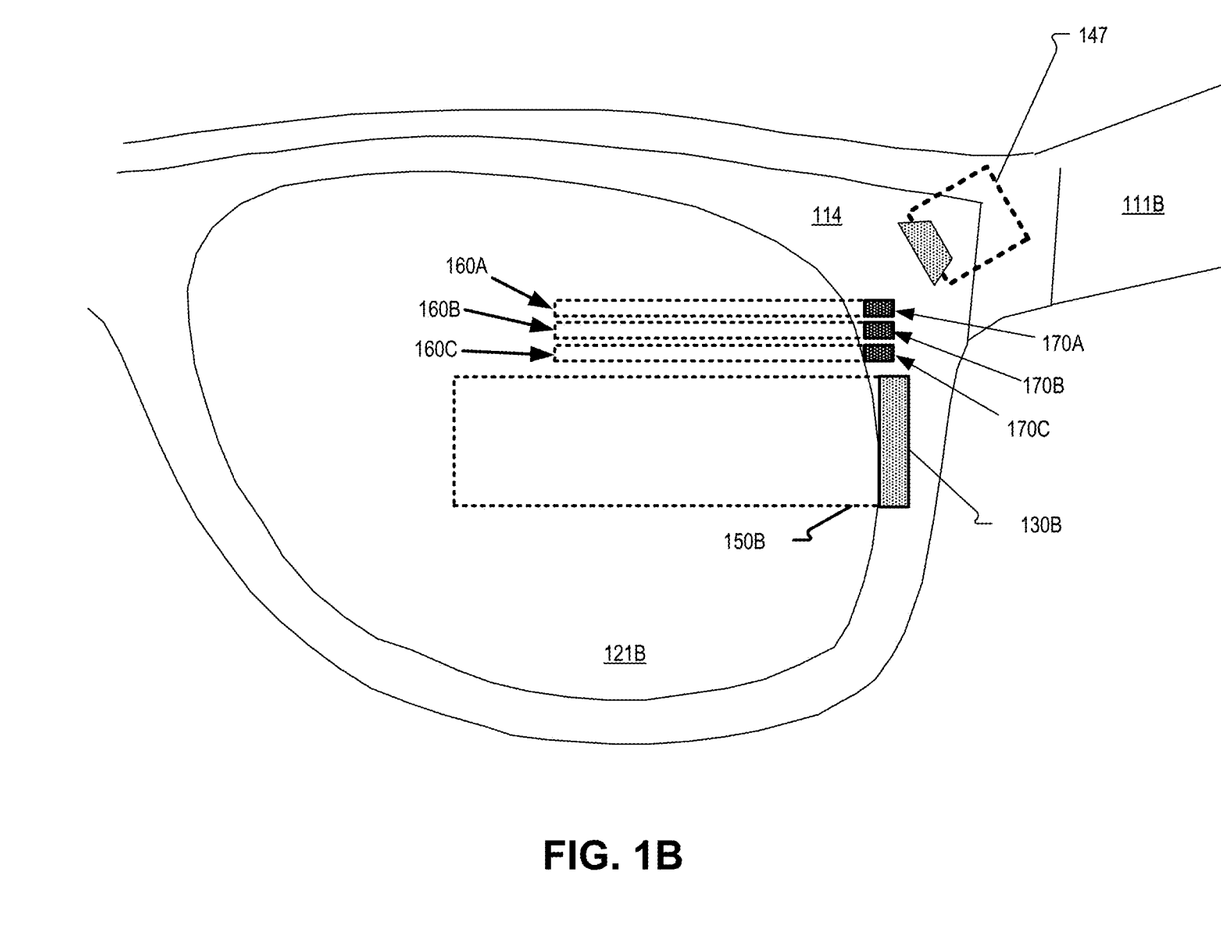

FIG. 1B illustrates a zoomed in view of a portion of example HMD 100, in accordance with an embodiment of the disclosure. FIG. 1B illustrates waveguide 160A, 160B, and 160C coupled to receive coherent illumination light from coherent illumination light sources 170A, 170B, and 170C, respectively. The coherent illumination light from a given coherent light source may be both spatially coherent and temporally coherent. Coherent illumination light may be narrow-band infrared light emitted from a laser source.

Figure 2A:
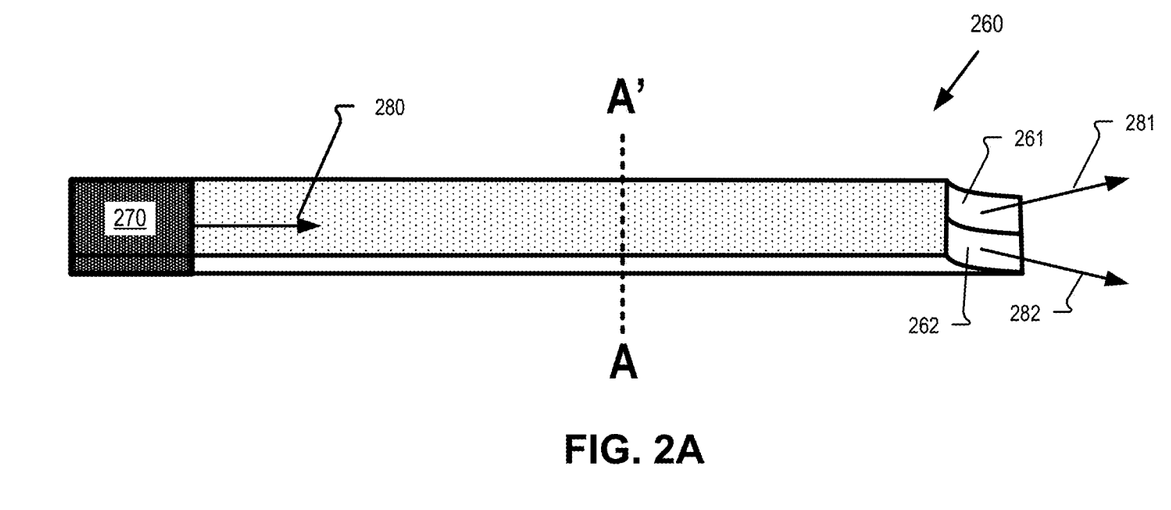
FIGS. 2A and 2B illustrate an example waveguide having two extraction features for generating interference patterns, in accordance with an embodiment of the disclosure.

FIG. 2A illustrates an example waveguide 260 that could be utilized as waveguides 160A, 160B, and 160C, in accordance with an embodiment of the disclosure. Waveguide 260 receive coherent illumination light 280 from coherent illumination source 270. Coherent illumination source 270 can be coupled into the waveguide 260 using a prism, microlens, or grating structures. Coherent illumination light 280 propagates in waveguide 260 from a first end of the waveguide (near coherent illumination source 270) to a second end of the waveguide 260 that is opposite the first end. Extraction features 261 and 262 receive the coherent illumination light 280.

First extraction feature 261 is configured to receive the coherent illumination light 280 and direct a first light projection 281 to a first area that includes at least a portion of an eyebox area. The first area may cover the entire eyebox area in some embodiments. Second extraction feature 262 is configured to receive the coherent illumination light 280 and direct a second light projection 282 to a second area that overlaps the first area. The overlap between the first light projection 281 in the first area and the second light projection 282 in the second area generates an interference pattern.

In one embodiment, first extraction feature 261 and second extraction feature 262 are both biconical surfaces fabricated in parallel at the second end of waveguide 260. The orientation and the curvature of the two biconical surfaces can be tuned to vary the orientation of the emission cone and the divergence of the cone of light projection 281 and/or 282 to generate the interference pattern on the proper position in the eyebox area. A highly reflective coating (e.g. metal or dielectric coating) may overlay the biconical surfaces to maximize the light directed toward the eyebox.

In embodiments where waveguide 260 includes a ridge waveguide, the ridge may be written onto an optical substrate (e.g. lens 121) and may be laminated to the optical substrate with an index-matched material where the refractive index of the lamination/bonding material is matched to the optical substrate. The refractive index of the optical substrate may be lower than index of waveguide 260 so that the total internal reflectivity (TIR) of waveguide 260 may be maintained to confine coherent illumination light 280 to waveguide 260. Waveguide 260 may facilitate single-mode functionality where illumination light 280 propagates through waveguide 260 in the transverse mode and propagates parallel to the length of waveguide 260 (from the first end to the second end). In an embodiment, the length of waveguide 260 is approximately 20 mm. Waveguides 170A, 170B, and 170C may have differing lengths, in some embodiments.

First extraction feature 261 is spaced a distance from second extraction feature 262 so the first light projection 281 interferes with the second light projection 282 to form a structured light interference pattern on the eye. First extraction feature 261 and second extraction feature 262 may simulate a point source and emit conical shaped light projection 281 and conical shaped light projection 282.

Figure 2B:
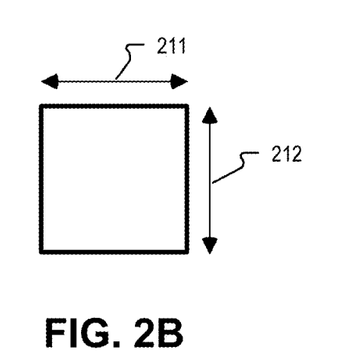

FIG. 2B illustrates a cross-section view of example waveguide 260 in FIG. 2A along lines A-A', in accordance with an embodiment of the disclosure. The cross section of waveguide 260 may be rectangular. The cross section of waveguide 260 may be square. In one embodiment, dimension 211 is approximately 10 microns and dimension 212 is approximately 10 microns. In one embodiment, dimension 211 is approximately 8 microns and dimension 212 is approximately 8 microns. Waveguide 260 may have dimensions small enough to be unnoticeable by a wearer of HMD 100.

Figure 3:
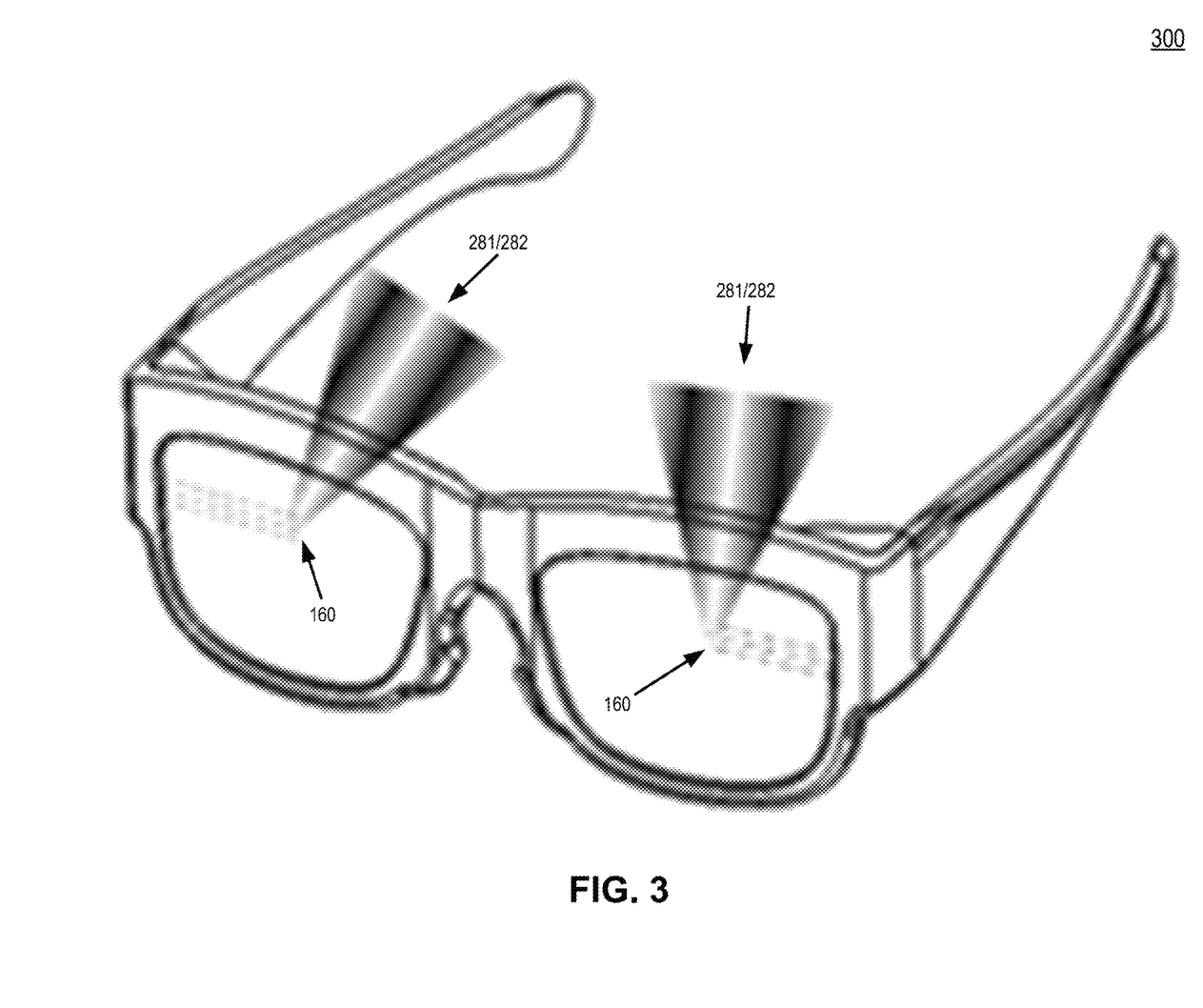
FIG. 3 illustrates an example head mounted display directing light projections to form interference patterns, in accordance with an embodiment of the disclosure.

FIG. 3 illustrates an example HMD 300 that includes waveguides projecting interference patterns in an eyebox area, in accordance with an embodiment of the disclosure. In FIG. 3, waveguide(s) 160 are configured to direct first light projection 281 and second light projection 282 to the eyebox area to form an interference pattern generated by the interference of light 281 and 282.

Figure 4:
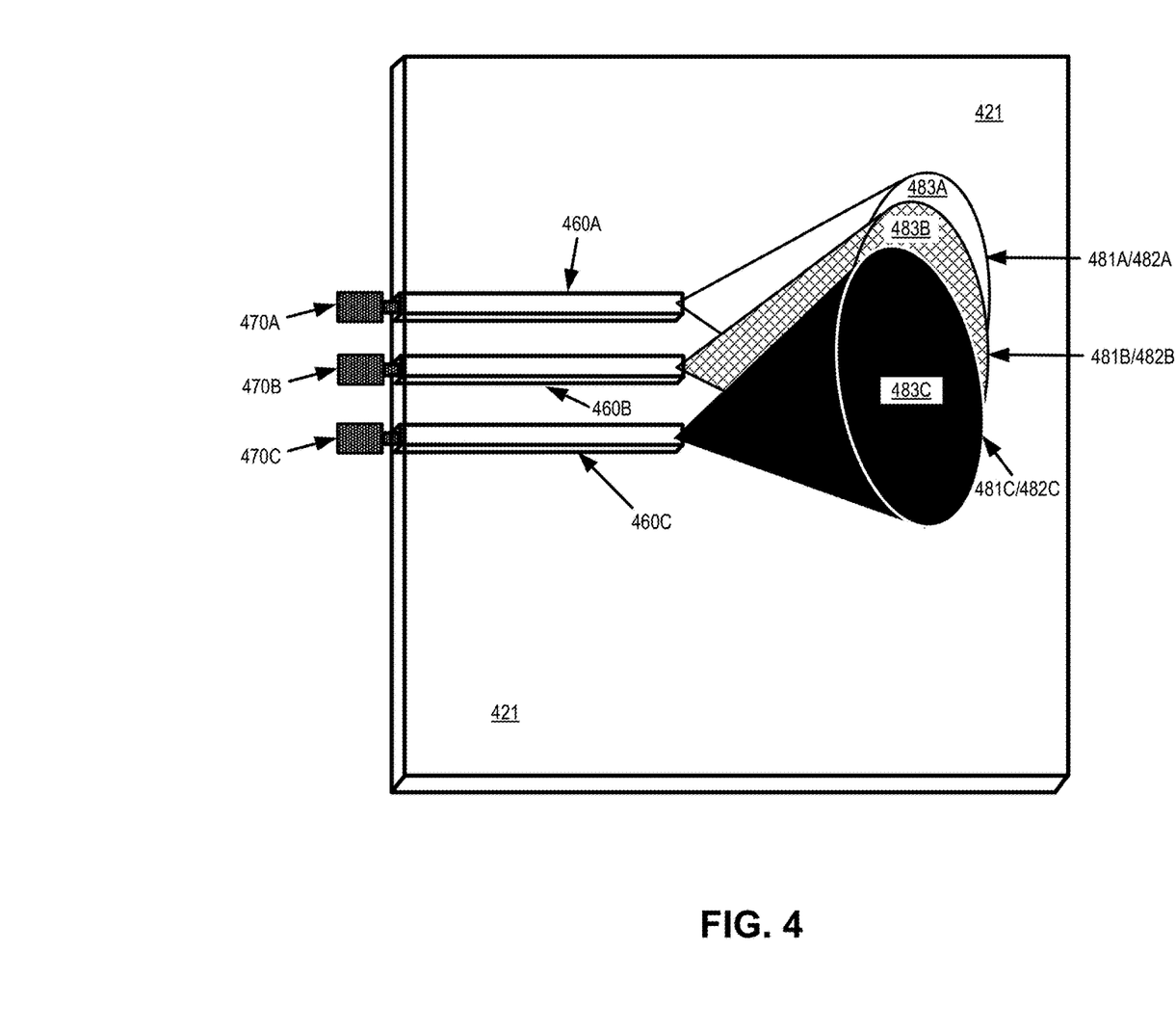
FIG. 4 illustrates an example optical substrate and three waveguides generating three emission cones, in accordance with an embodiment of the disclosure.

FIG. 4 illustrates an optical substrate 421 and three waveguides 460 emitting three emission cones to generate three interference patterns that are phase-shifted from one another, in accordance with an embodiment of the disclosure. In FIG. 4, coherent illumination sources 470A, 470B, and 470C are optically coupled to waveguides 460A, 460B, and 460C, respectively, to provide coherent illumination light (e.g. light 280) to each waveguide. Each waveguide 460 includes two extraction features such as extraction features 261/262 to direct first and second projections 481/482 to the eyebox area. The first emission cone 483A corresponding to waveguide 460A includes first light projection 481A and second light projection 482A. The second emission cone 483B corresponding to waveguide 460B includes first light projection 481B and second light projection 482B and the third emission cone 483C corresponding to waveguide 460C includes first light projection 481C and second light projection 482C. In some embodiments, only one emission cone 483 is incident on the eyebox area at a given point in time as the emission cones 483 may be time-multiplexed with each other.

Figure 5:
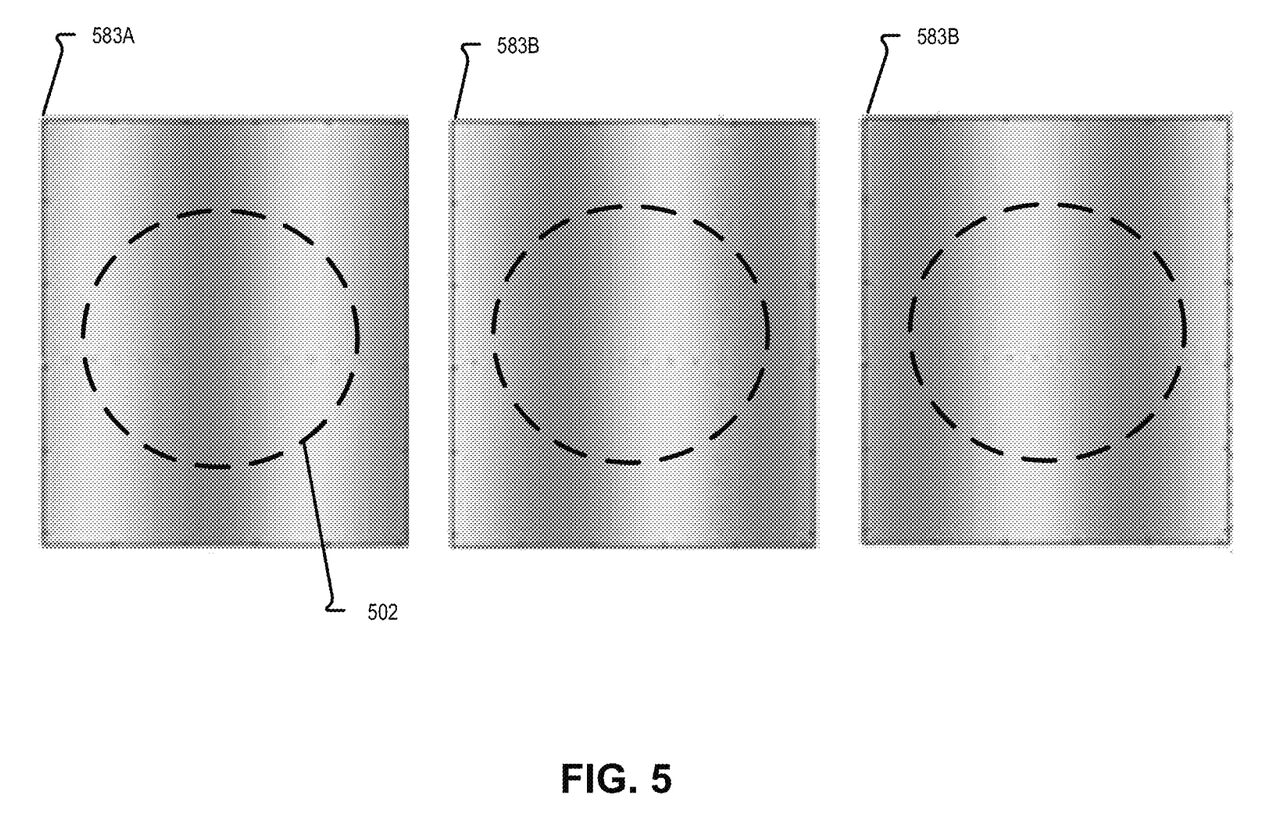
FIG. 5 illustrates example phase-shifted interference images, in accordance with an embodiment of the disclosure.

FIG. 5 illustrates images of phase-shifted interference patterns generated by different waveguides, in accordance with an embodiment of the disclosure. FIG. 5 includes images 583A, 583B, and 583C of the interference patterns on an eye 502 generated by emission cones 483A, 483B, and 483C, respectively. In one embodiment, the interference patterns generated by emission cones 483A/B/C are phase-shifted by 120 degrees. For example, image 583B may be an image of an interference pattern that is shifted 120 degrees from the interference pattern of image 583A and image 583C may be an image of an interference pattern that is shifted 240 degrees from the interference pattern of image 583A. Since extraction features 261/262 of a waveguide 260/460 generate a first light projection and a second light projection that is highly coherent, the interference pattern includes a stable periodic fringe on the eyebox area. Notably, the dark and light fringes in images 583A/B/C are positioned differently—consistent with the phase-shifted difference between the image 583A/B/C.

Returning again to FIG. 4, the extraction features of waveguides 460 may be separated by different distances in order to generate interferences patterns that are phase-shifted from each other. For example, the extraction features (e.g. 261/262) of waveguide 460A may be spaced a first distance from each other, the extraction features of waveguide 460B may be spaced a second distance from each other, and the extraction features of waveguide 460C may be spaced a third distance from each other. In one embodiment, the spacing between the waveguides themselves (e.g. 460A/B/C) determines the phase-shift of the interference patterns from one another. To generate interference images 583A/B/C, the coherent illumination source 470 may be activated for a first time period and a camera (e.g. 147) may capture image 583A of the interference pattern generated by emission cone 483A during the first time period. After the first time period, coherent illumination source 470A may be deactivated (turned off) and coherent illumination source 470B may be activated for a second time period where the camera captures image 583B of the interference pattern generated by emission cone 483B during the second time period. After the third time period, coherent illumination source 470B may be deactivated (turned off) and coherent illumination source 470C may be activated for a third time period where the camera captures image 583C of the interference pattern generated by emission cone 483C during the third time period. In other words, the coherent illumination light sources may be activated sequentially in order to generate phase-shifted interference patterns on the eye of a wearer of HMD and the image capturing of the camera will be coordinated to capture the phase-shifted interference patterns. In this context, the coherent illumination sources may have the same central wavelength.

In contrast to the sequential time-multiplexed scenario described in the above paragraph, a different embodiment allows for simultaneously capturing the three or more interference patterns generated by emission cones 483. To facilitate this simultaneous capture of the three or more interference patterns, each waveguide is illuminated with a coherent illumination source having a different wavelength. For example, the first waveguide may be illuminated with a first wavelength, the second waveguide may be illuminated with a second wavelength, and the third waveguide may be illuminated with a third wavelength. A high-resolution image sensor may be configured with filters matched to the first, second, and third wavelength. For example, instead of the conventional Red/Green/Blue (RGB) filters applied to imaging pixels included in sub-pixels of image sensors, the RGB filters are replaced with a first filter that passes the first wavelength and rejects other wavelengths, a second filter that passes the second wavelength and rejects other wavelengths, and a third filter that passes the third wavelength and rejects other wavelengths. Therefore, when the electronic shutter of the image sensor captures an image, there are actually three sub images included in the images. The first sub-image is of the first interference pattern having the first wavelength, the second sub-image is of the second interference pattern having the second wavelength, and the third sub-image is of the third interference pattern having the third wavelength.

In some embodiments, a single coherent illumination source is used to sequentially provide coherent illumination light to waveguides 460A/B/C. In this embodiment, an optical fiber may carry coherent illumination light from a single coherent light source to an optical switch that will be sequentially switched to provide the coherent illumination light to the waveguides 460A/B/C, one at a time.

In some embodiments, coherent illumination sources 460A/B/C may have different wavelengths in order to generate phase-shifted interference patterns. In this embodiment, extraction features 261 and 262 of waveguides 460A/B/C may be spaced the same distance apart and the wavelength difference in the illumination sources is relied upon to generate the phase-shifted interference patterns. The extraction features 261 and 262 of waveguides 460A/B/C may also be spaced differently even when the wavelength difference in the illumination sources is different.

In yet another embodiment, a swept laser provides the coherent illumination light to each waveguide 460A/B/C at different times. The wavelength of a swept laser can be tuned. The wavelength of some swept lasers is tuned according to a drive current of the laser, for example. Hence, a swept laser with its output sequentially switched to waveguides 460A/B/C may sequentially provide coherent illumination light to the waveguides 460A/B/C at different times. The swept laser may be driven so that different wavelengths of coherent illumination light provided to each waveguide 460A/B/C corresponds with a 120-degree phase shift on the interference patterns generated by emission cones 483A/B/C.

While the implementation of embodiments of this disclosure have thus far references a phase shift of 120 degrees, those skilled in the art appreciate that depth information could also be determined with interference patterns having different phase shifts such as four interference patterns having phases of 0 degrees, 90 degrees, 180 degrees, and 270 degrees, for example. In this embodiment, four waveguides 460 may need to be provided to generate the four interference patterns (phase-shifted by 90 degrees from each other). Other phase-shift values (e.g. 60 degrees) are also contemplated.

Figure 6:
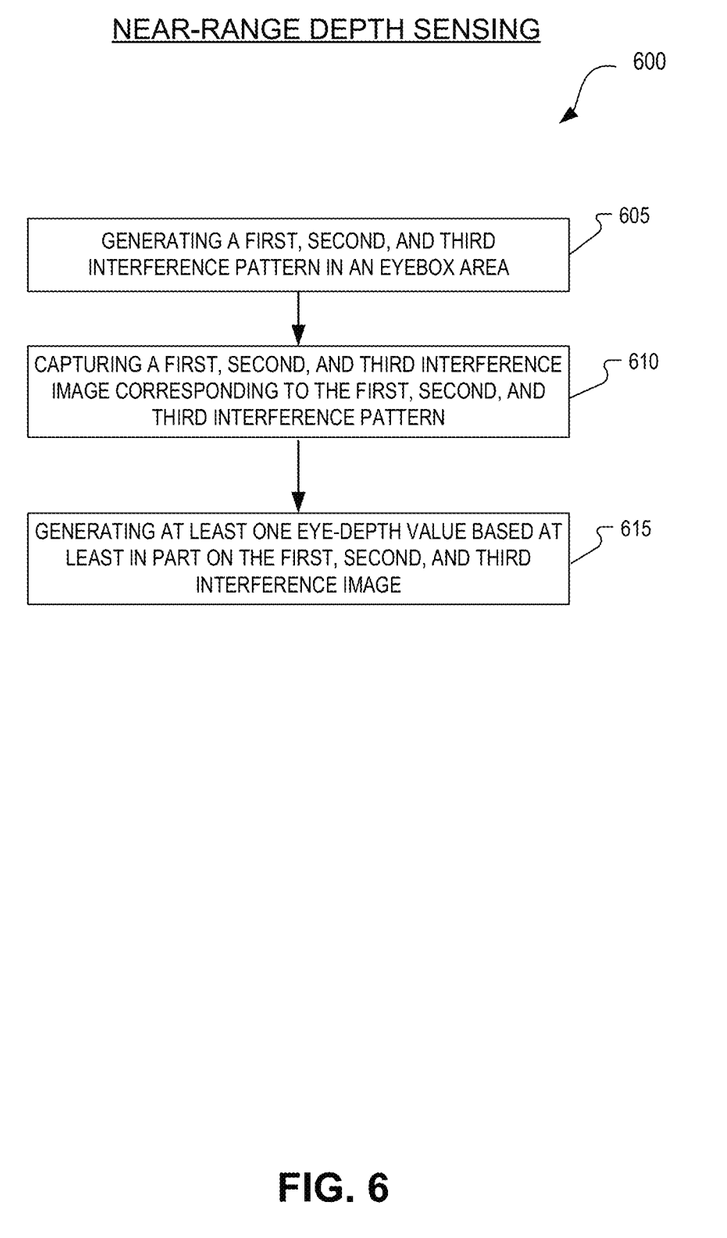
FIG. 6 illustrates an example flow chart for a method of near-range depth sensing, in accordance with an embodiment of the disclosure.

FIG. 6 illustrates an example process of near-range depth sensing in accordance with an embodiment of the disclosure. The order in which some or all of the process blocks appear in process 600 should not be deemed limiting. Rather, one of ordinary skill in the art having the benefit of the present disclosure will understand that some of the process blocks may be executed in a variety of orders not illustrated, or even in parallel.

Near-range depth sensing may be defined as sensing a depth of an object that is within 30 cm. In one embodiment, near-range depth sensing includes sensing a depth of an object (e.g. an eye) within 50 mm. The depth data may be used to determine eye gaze, capturing biometric features of a user of an HMD for recognition purposes, and/or to analyze eye-movements for different tasks.

In process block 605, a first, second, and third interference pattern is generated in an eyebox area. The first, second, and third interference patterns may be generated by emission cones 483A/B/C corresponding to waveguides 460A/B/C, for example. In one embodiment, generating the first, second, and third interference patterns includes directing coherent illumination light into at least one waveguide where the at least one waveguide includes a first extraction feature to direct the first light projection to a first area and a second extraction feature to direct a second light projection to second area different from the first area.

In process block 610, first, second, and third interference images (e.g. 583A/B/C) corresponding with the first, second, and third interference patterns are captured. The first, second, and third interference patterns may be generated sequentially and captured sequentially by the camera (e.g. camera 147).

In process block 615, at least one eye-depth value is generated based at least in part on the first, second, and third interference image. In some embodiments, a three-dimensional image of the eye is generated using the plurality of pixel values from a pixel array of the camera.

The eye of the wearer of an HMD will distort the fringes of the phase-shifted interference patterns projected onto the eye and after the three images 583A/B/C of phase-shifted interference patterns are captured by the camera, three-dimensional depth information (in dimension "z") can be reconstructed using a triangulation model of phase disparities using the pixel disparities in dimensions "x" and "y" corresponding with a pixel array of the camera. For example, the camera may include a CMOS pixel array having "i" rows and "j" columns that correspond with dimension x and y. Each phase disparity calculation associated with each pixel yields an eye-depth value (in dimension z) for that pixel. Hence, the eye-depth value of each pixel combined with the x and y dimensions of the pixel array allows for a three-dimensional depth mapping of the eye.

An eye-depth value or three-dimensional mapping of the eye may be used for eye-tracking purposes and a display image or display images directed to an eye of the user may be changed based on the eye-depth value or three-dimensional mapping. In one embodiment, a position of a software-generated blur filter is applied to display images in response to the eye-depth value(s) to provide focusing cues for a user of an HMD.

The example algorithm of generating eye-depth values or three-dimensional mappings of the eye using phase-shifted interference patterns described in U.S. non-provisional patent application Ser. No. 16/025,837 can be utilized in accordance with embodiments of this disclosure. U.S. non-provisional patent application Ser. No. 16/025,837 filed Jul. 2, 2018 is hereby incorporated by reference.

Processing logic included in an HMD may be coupled to sequentially activate coherent illumination sources 470 and also coupled to a camera (e.g. 147) to sequentially capture the phase-shifted interference patterns to execute example process 600 and other techniques described herein.

Figure 7:
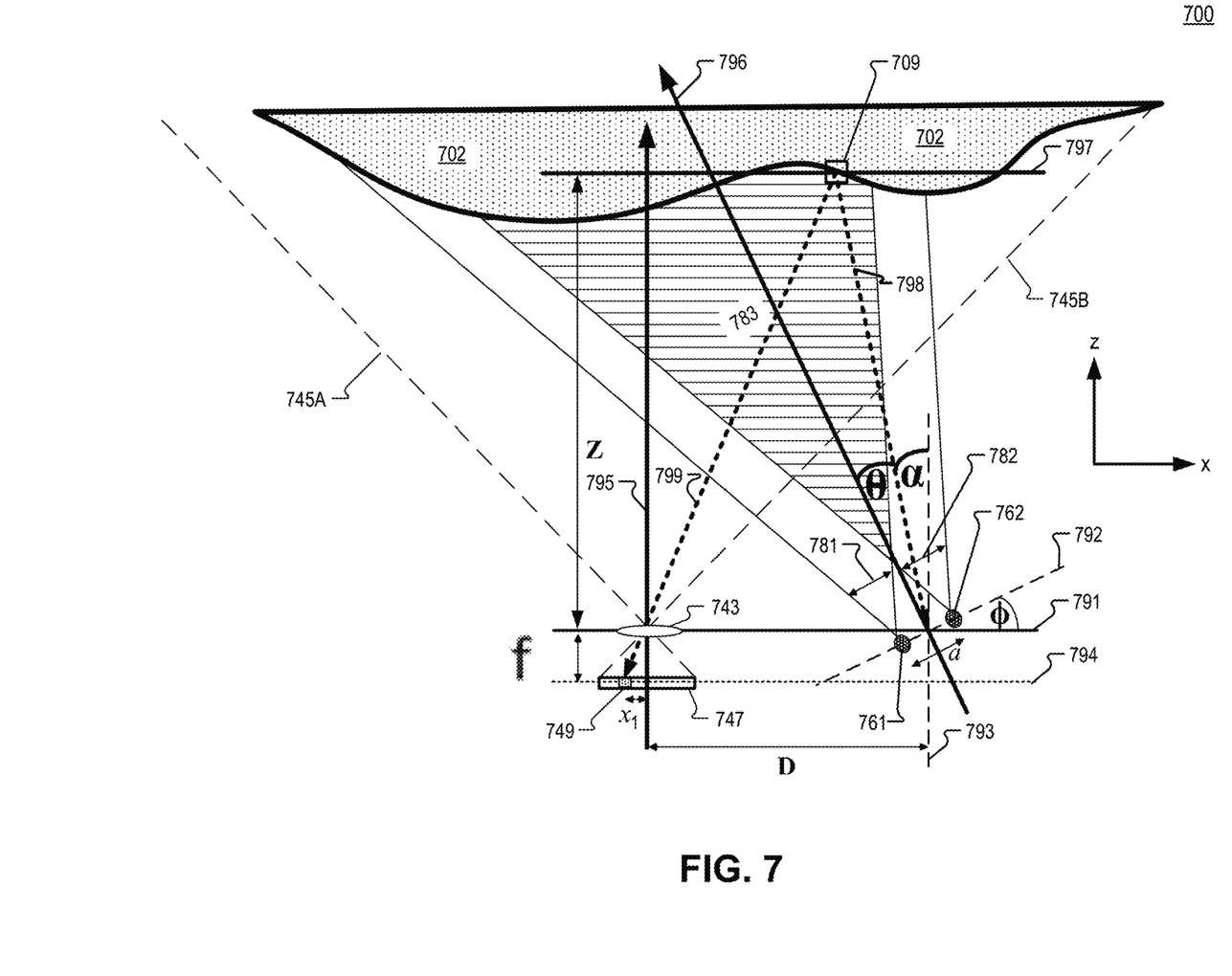
FIG. 7 illustrates a top down view of a system for near-range depth sensing, in accordance with an embodiment of the disclosure.

FIG. 7 illustrates a top down view of a system 700 for near-field depth sensing, in accordance with an embodiment of the disclosure. System 700 may be included in an HMD and be used for triangulation in near-eye depth sensing, in some contexts. Although FIG. 7 illustrates only two extraction features 761 and 762, it is understood that system 700 may also be used with additional extraction features corresponding with additional waveguides. System 700 includes an object 702, a first extraction feature 761, a second extraction feature 762, and an image sensor 747. In FIG. 7, lens 743 is configured to focus light onto image sensor 747 to provide imaging in a field of view 745 between dashed lines 745A and 745B. Lens 743 is disposed in plane 791 and imaging axis 795 is normal to plane 791, in the illustrated embodiment. In some embodiments, lens 743 is offset from plane 791 while still being positioned at the center of image sensor 747. Lens 743 is spaced from image sensor 747 by a focal length f. Imaging axis 795 may run through a central optical axis of lens 743 and through a middle of a pixel array having x rows and y columns. Axis 795 is spaced from axis 793 by separation diameter D in the x direction.

Extraction features 761 and 762 are spaced a distance "a" apart. First extraction feature 761 directs coherent illumination light provided by a waveguide (e.g. 260, not illustrated) toward object 702 as first light projection 781 and second extraction feature 762 directs the coherent illumination light provided by the waveguide toward object 702 as second light projection 782. First light projection 781 and second light projection 782 may have conical emission cones. The overlap of light 781 and 782 is illustrated as overlapping light 783 and the interference of light 781 and 782 forms an interference pattern on object 702. The interference pattern projected on object 702 may be described by a sinusoidally varying intensity pattern. Axis 792 runs through extraction features 761 and 762. φ represents an angle between plane 791 and axis 792. Axis 793 runs through a mid-point between extraction features 761 and 762 while also being normal to plane 791. Projection axis 796 runs through the mid-point between extraction features 761 and 762 and represents a middle of overlapping light 783.

The intensity measured by pixel 749 of image sensor 747 corresponds to the intensity on object surface 702 at position 709 within plane 797. Plane 797 may be within a distance z of plane 791. Distance z may be less than 50 mm, in some embodiments. The intensity of the interference pattern light at position 709 becomes incident upon pixel 749 propagating along optical path 799. Pixel 749 is offset from imaging axis 795 by distance $x_1$. Axis 798 runs from the midpoint between extraction feature 761 and 762 to the middle of position 709. θ defines the angle from axis 796 to axis 798 and a defines the angle between axis 798 and axis 793. The angles θ and a may be different for different pixels on image sensor 747 and can be determined, for example, through a camera calibration procedure. To integrate system 700 into an HMD such as HMD 100, a calibrated baseline dimension D to form a triangulation between the illuminator (e.g. extraction features 761 and 762) and the image sensor 747 may be taken.

Figure 8:
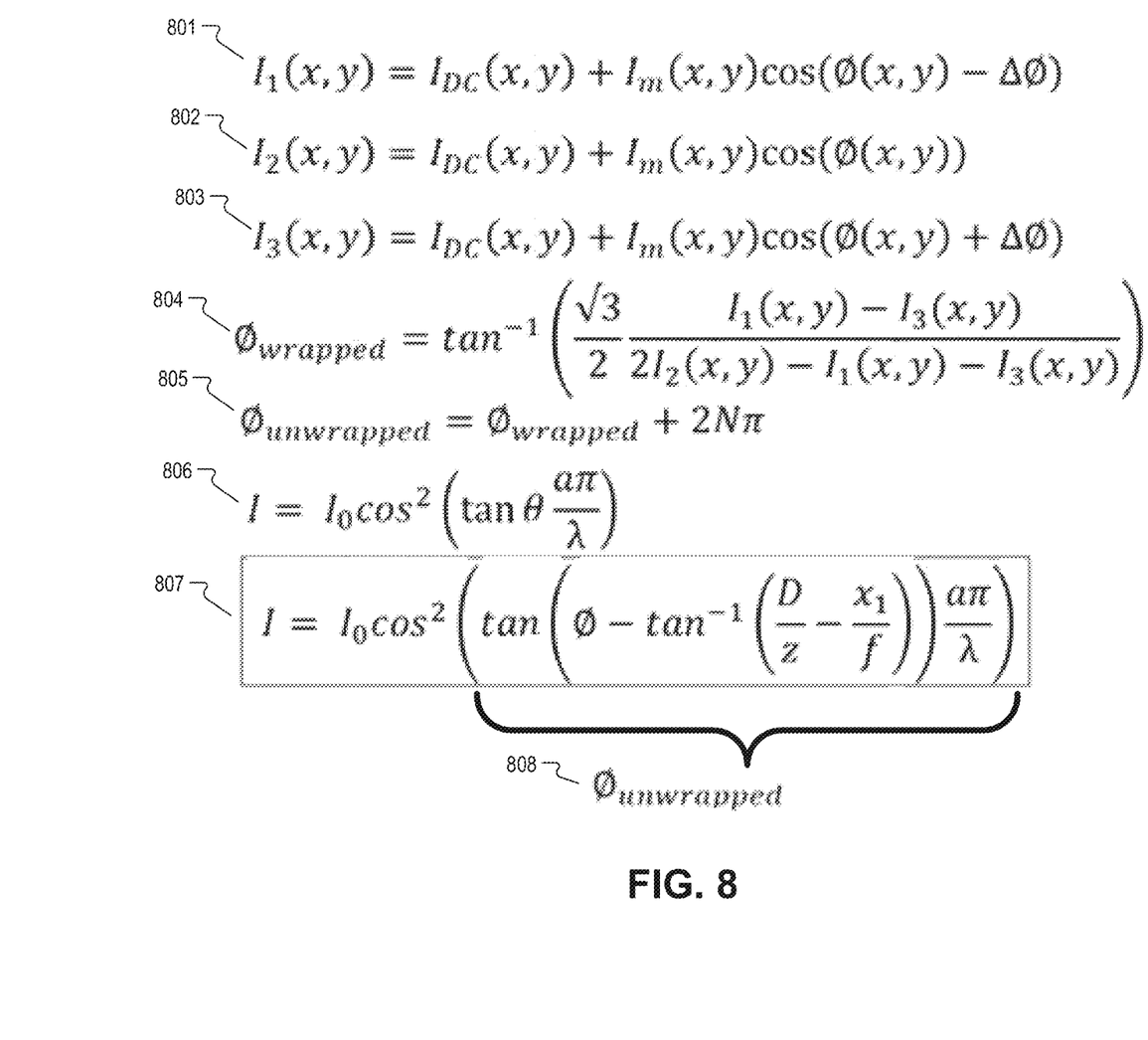
FIG. 8 illustrates example equations that may be utilized for generating a depth map of an object, in accordance with an embodiment of the disclosure.

To determine the depth z for a given position (e.g. 709) of object surface 702, the equations of FIG. 8 may be utilized, in accordance with an embodiments of the disclosure. Equation 801 provides the intensity at a position x, y for a first interference image (e.g. image 583A). Equation 802 provides the intensity at a position x, y for a second interference image (e.g. image 583B) and equation 803 provides the intensity at a position x, y for a third interference image (e.g. image 583C). In equations 801, 802, and 803, Ø represents the phase-shift of the phase-shifted interference patterns on object 702 generated by emission cones 483A/B/C, for example. Hence, ΔØ may be 120 degrees. As described above, the spacing of extraction features 761 and 762 may be different in different waveguides to provide the desired phase-shift Ø. Equation 804 provides for the wrapped phase calculation and equation 805 provides the unwrapped phase calculation where N equals the number of phase shifts used. Where ΔØ is 120 degrees, N may equal 3. If ΔØ was 90 degrees, N may be 4, for example. Equation 806 provides the expected intensity as a function of the angular position θ for a two-beam interference pattern where λ is the wavelength of emitted light and a is the spacing distance of the extraction features 761 and 762 emitting the light. Equation 807 is an expanded version of equation 806 that includes an unwrapped phase component 808 including variable z where D is the baseline between the camera and the illuminator, $x_1$ is the pixel position on the camera focal array, and f is the effective focal length of the camera. Therefore, solving equation 807 for variable z provides the depth z for a particular position 709 of the surface of an object 702. And solving for a two-dimensional array of a plurality of positions of object 702 provides a three-dimensional depth mapping of depth z of the surface of object 702.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Communication channels may include or be routed through one or more wired or wireless communication utilizing IEEE 802.11 protocols, BlueTooth, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A Head Mounted Display (HMD) comprising:
   at least one camera configured to image an eyebox area; and
   an optical structure to be positioned in a view of a user of the HMD, wherein the optical structure includes a first, a second, and a third waveguide, each of the first, second, and third waveguides configured to receive coherent illumination light and direct the coherent illumination light to the eyebox area as a first light projection and a second light projection to generate a first, second, and third interference pattern corresponding to the first, second, and third waveguides, respectively, wherein the coherent illumination light is coherent near-infrared light, and wherein the camera is configured to capture the first, second, and third interference patterns.

2. The HMD of claim 1, wherein the first, second, and third waveguide each includes a first extraction feature to direct the first light projection a first area and a second extraction feature to direct the second light projection to an area different from the first area, and wherein an overlap of the first light projection and the second light projection from each respective waveguide generate the respective interference pattern on the eyebox area.

3. The HMD of claim 2 further comprising:
   a first coherent light source configured to emit first coherent illumination light, wherein the first waveguide is configured to receive the first coherent illumination light;
   a second coherent light source configured to emit second coherent illumination light, wherein the second waveguide is configured to receive the second coherent illumination light; and
   a third coherent light source configured to emit third coherent illumination light, wherein the third waveguide is configured to receive the third coherent illumination light, and wherein the first and second extraction feature of the first, second, and third waveguides are spaced differently to generate a first, second, and third interference pattern, respectively, that are phase-shifted from each other, and further wherein the first, second, and third coherent illumination light are the same wavelength.

4. The HMD of claim 3, wherein the third interference pattern is phase-shifted from the second interference pattern by 120 degrees, and wherein the second interference pattern is phase-shifted from the first interference pattern by 120 degrees.

5. The HMD of claim 3 further comprising:
   a fourth coherent light source, wherein the optical structure includes a fourth waveguide configured to generate a fourth interference pattern in the eyebox area, wherein the fourth interference patter is phase-shifted from the third interference pattern by 90 degrees, the third interference pattern is phase-shifted from the second interference pattern by 90 degrees, and the second interference pattern is phase-shifted from the first interference pattern by 90 degrees.

6. The HMD of claim 2 further comprising:
a first coherent light source configured to emit first coherent illumination light, wherein the first waveguide is configured to receive the first coherent illumination light;
a second coherent light source configured to emit second coherent illumination light, wherein the second waveguide is configured to receive the second coherent illumination light; and
a third coherent light source configured to emit third coherent illumination light, wherein the third waveguide is configured to receive the third coherent illumination light, wherein the first, second, and third coherent illumination light are at different near-infrared wavelengths.

7. The HMD of claim 2, wherein at least one of the first extraction feature or the second extraction feature includes a reflective coating configured to direct the first light projection or the second light projection.

8. The HMD of claim 1, wherein the first, second, and third interference patterns includes sinusoidal fringe patterns.

9. The HMD of claim 1, wherein the camera includes a filter that passes a near-infrared wavelength range matched to the coherent illumination light and rejects other wavelength ranges.

10. The HMD of claim 1, wherein a coherent light source providing the coherent illumination light includes at least one of near-infrared vertical-cavity surface-emitting laser (VCSEL), laser diode, superluminescent light emitting diode (SLED) with high spatial coherency, or distributed feedback laser (DFB).

11. The HMD of claim 1, wherein an imaging axis of the camera in relation to a projection axis between the first and second light projection is greater than 30 degrees.

12. The HMD of claim 1, wherein the first, second, and third waveguides are configured as single-mode waveguides.

13. An optical structure comprising:
a transparent layer; and
a first, a second, and a third waveguide, each configured to guide coherent illumination light, wherein the first, second, and third waveguides are coupled with the transparent layer, wherein the coherent illumination light is coherent near-infrared light, and wherein each of the first, second, and third waveguide include:
a first extraction feature configured to direct the coherent illumination light as a first light projection in an eyebox area; and
a second extraction feature configured to direct the coherent illumination light as a second light projection in the eyebox area, wherein the first light projection and the second light projection interfere to generate an interference pattern.

14. The optical structure of claim 13, wherein the first and second extraction feature of the first, second, and third waveguides are spaced differently to generate a first, second, and third interference pattern, respectively, that are phase-shifted from each other.

15. The optical structure of claim 13, wherein at least one of the first extraction feature or the second extraction feature includes a reflective coating configured to direct the first light projection or the second light projection, wherein the reflective coating includes a dielectric or metallic coating configured to reflect the first light projection or the second light projection and pass visible light.

16. A method of near-eye depth sensing, the method comprising:
generating a first light projection and a second light projection with each of a first waveguide, a second waveguide, and a third waveguide, wherein the first light projection and the second light projection are generated in response to coherent near-infrared light directed by the first, second, and third waveguides;
generating a first, second, and third interference pattern in an eyebox area in response to the first light projection and the second light projection generated by the first, second, and third waveguides, respectively;
capturing, with a camera, a first, second, and third interference image corresponding to the first, second, and third interference pattern, respectively; and
generating at least one eye-depth value based at least in part on the first, second, and third interference image.

17. The method of claim 16, wherein each of the first, second, and third waveguides include a first extraction feature to direct the first light projection to a first area and a second extraction feature to direct the second light projection to second area different from the first area.

18. The method of claim 16, wherein the first, second, and third interference patterns are generated sequentially and captured sequentially by the camera as the first, second, and third interference images.

* * * * *